US012769293B2

(12) United States Patent
Lu et al.

(10) Patent No.: US 12,769,293 B2
(45) Date of Patent: Oct. 20, 2026

(54) COMPACT-FORM MODEL-FREE ADAPTIVE DISTURBANCE COMPENSATION CONTROL IN THE PRESENCE OF UNMEASURABLE DISTURBANCES

(71) Applicant: Zhejiang University, Hangzhou (CN)

(72) Inventors: Jiangang Lu, Hangzhou (CN); Chen Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 413 days.

(21) Appl. No.: 18/495,321

(22) Filed: Oct. 26, 2023

(65) Prior Publication Data

US 2024/0152128 A1 May 9, 2024

(30) Foreign Application Priority Data

Oct. 28, 2022 (CN) ......................... 202211336364.8

(51) Int. Cl.
*G05B 13/00* (2006.01)
*G05B 19/418* (2006.01)

(52) U.S. Cl.
CPC .................. *G05B 19/41885* (2013.01); *G05B 2219/41115* (2013.01)

(58) Field of Classification Search
CPC .... G05B 19/41885; G05B 2219/41115; G05B 13/024
See application file for complete search history.

(56) References Cited

PUBLICATIONS

Zhang, Feilong (Model-Free Adaptive Control Compensated with Disturbance, https://arxiv.org/pdf/2105.11820v1, May 25, 2021, attached as pdf) (Year: 2021).*
Larsson, Tomas (Adaptive control of a static multiple input multiple output system, https://ieeexplore.ieee.org/stamp/stamp.jsp?tp=&arnumber=878672, Jun. 2000, attached as pdf) (Year: 2000).*

* cited by examiner

*Primary Examiner* — Aleksey Olshannikov
(74) *Attorney, Agent, or Firm* — MUNCY, GEISSLER, OLDS & LOWE, PC

(57) ABSTRACT

A method of compact-form model-free adaptive disturbance compensation control in the presence of unmeasurable disturbances, includes establishing a dynamic data model of a controlled plant subject to unmeasurable disturbances, wherein the dynamic data model is described by a pseudo Jacobian input matrix and a pseudo Jacobian disturbance matrix; constructing cost functions and solving their optimization problems to find optimal values of the pseudo Jacobian input matrix and the pseudo Jacobian disturbance matrix; designing a compact-form model-free adaptive disturbance compensation control law in the presence of unmeasurable disturbances; constructing an energy function and solving it by using a momentum gradient descent method to find optimal values of the compact-form adaptive input matrix and the compact-form adaptive disturbance matrix; controlling the controlled plant by using the control law. The control method of the present invention provides significant improvements in disturbance compensation control performance and achieves effective tracking of desired system outputs.

9 Claims, 7 Drawing Sheets

COMPACT-FORM MODEL-FREE ADAPTIVE DISTURBANCE COMPENSATION CONTROL IN THE PRESENCE OF UNMEASURABLE DISTURBANCES

FIELD OF THE INVENTION

The present invention relates to the field of automatic control, and more particularly to compact-form model-free adaptive disturbance compensation control in the presence of unmeasurable disturbances.

BACKGROUND OF THE INVENTION

Disturbances widely exist in actual control systems, such as controlled plants in oil refining, petrochemical, chemical, pharmaceutical, food, paper, water treatment, thermal power, metallurgy, cement, rubber, machinery, electrical, transportation, and robotics industries, including reactors, distillation towers, machines, equipment, devices, production lines, workshops, factories, unmanned vehicles, unmanned ships, unmanned aircraft, and autonomous mobile robots. The presence of disturbances may result in degradation of control performance or even instability, which affects the system's safety.

The existing compact-form model-free adaptive control method is proposed by Hou and Jin in *Model Free Adaptive Control: Theory and Applications* (Science Press, Beijing, China, 2013, p. 92). On this basis, inventions CN107991866A and CN107991865A investigate decoupled control schemes for multi-input and multi-output (MIMO) systems; inventions CN108132600A and CN108345213A develop self-tuning techniques for compact-form model-free adaptive control method based on neural networks, avoiding time-consuming manual tuning processes; invention CN109782588A proposes a compact-form model-free adaptive control with a different-factor architecture to address the challenge of the existing method that is difficult to achieve effective control of MIMO systems with different characteristics between channels; invention CN111522235A extends the results of invention CN109782588A and proposes a different-factor compact-form model-free control with parameter self-tuning, which overcomes the problem that it is hard to adjust the parameters effectively by trial-and-error method for MIMO control systems with high uncertainty, high complexity and high variability of characteristics between channels. It should be noted that none of the above inventions have yet considered the problem of compensation control of the MIMO system in the presence of disturbances.

For the MIMO system in the presence of unmeasurable disturbances, it is of great industrial application to design a disturbance compensation control method that attenuate disturbances and stabilize the control system by using I/O data directly without any physical information. To this end, the present invention discloses a method of compact-form model-free adaptive disturbance compensation control in the presence of unmeasurable disturbances.

SUMMARY OF THE INVENTION

The present invention addresses the above-identified problem and provides a method of compact-form model-free adaptive disturbance compensation control in the presence of unmeasurable disturbances, executed on a hardware platform for controlling a controlled plant subject to unmeasurable disturbances, said controlled plant being a multi-input multi-output (MIMO) system with a predetermined number of control inputs and a predetermined number of system outputs, said method comprising:

step 1: at time k, establishing a dynamic data model of said controlled plant subject to unmeasurable disturbances, wherein said dynamic data model is described by a pseudo Jacobian input matrix $\overline{\theta}(k)$ and a pseudo Jacobian disturbance matrix $\overline{\chi}(k)$;

step 2: constructing cost functions and solving optimization problems for said cost functions to find an optimal value of said pseudo Jacobian input matrix $\overline{\theta}(k)$ in said step 1 and an optimal value of said pseudo Jacobian disturbance matrix $\overline{\chi}(k)$ in said step 1;

step 3: employing said dynamic data model described by said optimal value of said pseudo Jacobian input matrix $\overline{\theta}(k)$ and said optimal value of said pseudo Jacobian disturbance matrix $\overline{\chi}(k)$ in said step 2, designing a compact-form model-free adaptive disturbance compensation control law in the presence of unmeasurable disturbances, wherein said control law comprising a compact-form adaptive input matrix $\overline{\pi}_c(k)$ and a compact-form adaptive disturbance matrix $\overline{\omega}_c(k)$;

step 4: constructing an energy function and solving said energy function by using a momentum gradient descent method to find an optimal value of said compact-form adaptive input matrix $\overline{\pi}_c(k)$ in said step 3 and an optimal value of said compact-form adaptive disturbance matrix $\overline{\omega}_c(k)$ in said step 3;

step 5: controlling said controlled plant by using said compact-form model-free adaptive disturbance compensation control law in the presence of unmeasurable disturbances with said optimal value of compact-form adaptive input matrix $\overline{\pi}_c(k)$ and said optimal value of compact-form adaptive disturbance matrix $\overline{\omega}_c(k)$ in said step 4, weakening the effect of unmeasurable disturbances on actual system outputs of said controlled plant, achieving effective tracking of desired system outputs of said controlled plant.

Said step 1, at time k, establishing a dynamic data model of said controlled plant subject to unmeasurable disturbances as $$\Delta y(k+1) = \overline{\theta}(k)\Delta u(k) + \overline{\chi}(k)\cdot 1_{q\times 1}$$

where k is a sampling time, k is a positive integer; y(k+1) is an actual system output vector of said controlled plant at time k+1, $y(k+1)=[y_1(k+1), \ldots, y_n(k+1)]^T$, $\Delta y(k+1)=y(k+1)-y(k)$; n is a total number of system outputs in said controlled plant, n is a positive integer greater than 1; u (k) is a control input vector of said controlled plant at time k, $u(k)=[u_1(k), \ldots, u_m(k)]^T$, $\Delta u(k)=u(k)-u(k-1)$; m is a total number of control inputs in said controlled plant, m is a positive integer greater than 1; $1_{q\times 1}[1; 1; \ldots; 1]_{q\times 1}$, q is a total number of unmeasurable disturbances in said controlled plant, q is a positive integer; $\overline{\theta}(k)$ is said pseudo Jacobian input matrix at time k and $\overline{\chi}(k)$ is said pseudo Jacobian disturbance matrix at time k.

Said step 2, constructing cost functions and solving optimization problems for said cost functions to find an optimal value of said pseudo Jacobian input matrix $\overline{\theta}(k)$ in said step 1 and an optimal value of said pseudo Jacobian disturbance matrix $\overline{\chi}(k)$ in said step 1, comprising:

step 2.1: constructing a cost function for said pseudo Jacobian input matrix $\overline{\theta}(k)$ as $$J(\bar{\theta}(k)) = \|\Delta y(k) - \bar{\theta}(k)\Delta u(k-1) - \bar{\chi}(k-1)\cdot 1_{q\times 1}\|^2 + \mu_1\|\Delta\bar{\theta}(k)\|^2$$

where $\mu_1$ is the first weighting factor; $\Delta\bar{\theta}(k)=\bar{\theta}(k)-\bar{\theta}(k-1)$; ||□|| is a Euclidean norm;

step 2.2: constructing a cost function for said pseudo Jacobian disturbance matrix $\bar{\chi}(k)$ as $$J(\bar{\chi}(k)) = \|\Delta y(k) - \bar{\theta}(k-1)\Delta u(k-1) - \bar{\chi}(k)\cdot 1_{q\times 1}\|^2 + \mu_2\|\Delta\bar{\chi}(k)\|^2$$

where $\mu_2$ is the second weighting factor; $\Delta\bar{\theta}(k)=(k)$—$(k-1)$;

step 2.3: solving an optimization problem for said $J(\bar{\theta}(k))$ in said step 2.1, finding an optimal value of said pseudo Jacobian input matrix $\bar{\theta}(k)$ as $$\bar{\theta}(k) = \bar{\theta}(k-1) + \frac{\alpha_1\left(\Delta y(k) - \bar{\theta}(k-1)\Delta u(k-1) - \bar{\chi}(k-1)\cdot 1_{q\times 1}\right)\Delta u(k-1)^T}{\mu_1 + \|\Delta u(k-1)\|^2}$$

where $\alpha_1$ is the first step size factor;

step 2.4: solving an optimization problem for said $J(\bar{\chi}(k))$ in said step 2.2, finding an optimal value of said pseudo Jacobian disturbance matrix $\bar{\chi}(k)$ as $$\bar{\chi}(k) = \bar{\chi}(k-1) + \frac{\alpha_2\left(\Delta y(k) - \bar{\theta}(k-1)\Delta u(k-1) - \bar{\chi}(k-1)\cdot 1_{q\times 1}\right)\cdot 1_{1\times q}}{\mu_2 + q}$$

where $\alpha_2$ is the second step size factor.

Said step 3, employing said dynamic data model described by said optimal value of said pseudo Jacobian input matrix $\bar{\theta}(k)$ and said optimal value of said pseudo Jacobian disturbance matrix $\bar{\chi}(k)$ in said step 2, designing a compact-form model-free adaptive disturbance compensation control law in the presence of unmeasurable disturbances as $$u(k) = u(k-1) - \bar{\pi}_c(k)e(k) + \bar{\varpi}_c(k)\cdot 1_{q\times 1}$$

where e(k) is a system error vector of said controlled plant at time k, e(k)=y (k)–y (k), y*(k) is a desired system output vector of said controlled plant at time k, $e(k)=[e_1(k), \ldots, e_n(k)]^T$, $\Delta e(k)=e(k)-e(k-1)$; $\bar{\pi}_c(k)$ is said compact-form adaptive input matrix at time k and $\bar{\varpi}_c(k)$ is said compact-form adaptive disturbance matrix at time k.

Said step 4, constructing an energy function and solving said energy function by using a momentum gradient descent method to find an optimal value of said compact-form adaptive input matrix $\bar{\pi}_c(k)$ in said step 3 and an optimal value of said compact-form adaptive disturbance matrix $\bar{\varpi}_c(k)$ in said step 3, comprising:

step 4.1: constructing an energy function as $$W = \frac{1}{2}\|y^*(k+1) - y(k+1)\|^2 + \frac{1}{2}\lambda\|\Delta u(k)\|^2$$

where y*(k+1) is a desired system output vector of said controlled plant at time k+1, $y^*(k+1)=[y^*_1(k+1), \ldots, y^*_n(k+1)]^T$; $\lambda$ is a penalty factor;

step 4.2: solving said energy function in said step 4.1 by using a momentum gradient descent method, finding an optimal value of said compact-form adaptive input matrix $\bar{\pi}_c(k)$ as $$\bar{\pi}_c(k) = \bar{\pi}_c(k-1) - \sigma_1\frac{\partial W}{\partial\bar{\pi}_c(k-1)} + \eta_1\Delta\bar{\pi}_c(k-1)$$

where $\sigma_1$ is the first learning rate, is the first momentum factor;

$$\Delta\bar{\pi}_c(k-1) = \bar{\pi}_c(k-1) - \bar{\pi}_c(k-2);\ \frac{\partial W}{\partial\bar{\pi}_c(k-1)}$$

is a partial derivative of said energy function W to $\bar{\pi}_c(k-1)$;

step 4.3: solving said energy function in said step 4.1 by using a momentum gradient descent method, finding an optimal value of said compact-form adaptive disturbance matrix $\bar{\varpi}_c(k)$ as $$\bar{\varpi}_c(k) = \bar{\varpi}_c(k-1) - \sigma_2\frac{\partial W}{\partial\bar{\varpi}_c(k-1)} + \eta_2\Delta\bar{\varpi}_c(k-1)$$

where $\sigma_2$ is the second learning rate, $\eta_2$ is the second momentum factor;

$$\Delta\bar{\varpi}_c(k-1) = \bar{\varpi}_c(k-1) - \bar{\varpi}_c(k-2);\ \frac{\partial W}{\partial\bar{\varpi}_c(k-1)}$$

is a partial derivative of said energy function W to $\bar{\varpi}_c(k-1)$.

Said partial derivative of said energy function W to $\bar{\pi}_c$(k–0 in said step 4.2 is calculated as $$\frac{\partial W}{\partial\bar{\pi}_c(k-1)} = \frac{\partial y(k)}{\partial u(k-1)}e(k)e(k-1)^T - \lambda\Delta u(k-1)e(k-1)^T;$$

said partial derivative of said energy function W to $\bar{\varpi}_c(k-1)$ in said step 4.3 is calculated as $$\frac{\partial W}{\partial\bar{\varpi}_c(k-1)} = -\frac{\partial y(k)}{\partial u(k-1)}e(k)\cdot 1_{1\times q} + \lambda\Delta u(k-1)\cdot 1_{1\times q}.$$

Said $$\frac{\partial y(k)}{\partial u(k-1)}$$

is calculated as $$\frac{\partial y(k)}{\partial u(k-1)} = \bar{\theta}(k)^T.$$

Said step 5, controlling said controlled plant by using said compact-form model-free adaptive disturbance compensation control law in the presence of unmeasurable disturbances with said optimal value of compact-form adaptive input matrix $\overline{\pi}_c(k)$ and said optimal value of compact-form adaptive disturbance matrix $\overline{\omega}_c(k)$ in said step 4, comprising:

step 5.1: obtaining a desired system output vector $y^*(k)$ and an actual system output vector $y(k)$, calculating a system error vector $e(k)$;

step 5.2: based on said step 5.1, calculating a control input vector $u(k)$ according to said compact-form model-free adaptive disturbance compensation control law in the presence of unmeasurable disturbances with said optimal value of said compact-form adaptive input matrix $\overline{\pi}_c(k)$ and said optimal value of said compact-form adaptive disturbance matrix $\overline{\omega}_c(k)$ in said step 4;

step 5.3: generating an actual system output vector of said controlled plant based on application of said control input vector $u(k)$.

Further, the present invention adopts the following technical solution:

A non-transitory computer-readable storage medium having a computer program stored thereon, wherein when said computer program is executed by a processor, causing said processor to carry out said method of compact-form model-free adaptive disturbance compensation control in the presence of unmeasurable disturbances.

Further, the present invention adopts the following technical solution:

An electronic device comprising a memory, a processor and a computer program stored on said memory and runnable on said processor, wherein when said processor executes said computer program, causing said processor to carry out said method of compact-form model-free adaptive disturbance compensation control in the presence of unmeasurable disturbances.

On the theoretical basis of existing compact-form model-free adaptive control, some prior arts have made progress in solving the decoupling control problem of strongly coupled MIMO systems, the problem of different characteristics between control channels in MIMO systems, and the online self-tuning of parameters in MIMO control systems. However, these inventions have not yet considered the problem of compensation control of the controlled plant subject to disturbances, which restricts the popularization and application of compact-form model-free adaptive control method. For the MIMO system subject to unmeasurable disturbances, designing a disturbance compensation control method to attenuate disturbances and stabilize the control system by using I/O data directly without any physical information is of great industrial application.

DETAILED DESCRIPTION OF THE INVENTION

The present invention is hereinafter described in detail with reference to the embodiments and accompanying drawings. It is to be understood that other embodiments may be utilized and structural changes may be made without departing from the scope of the present invention.

Figure 1:
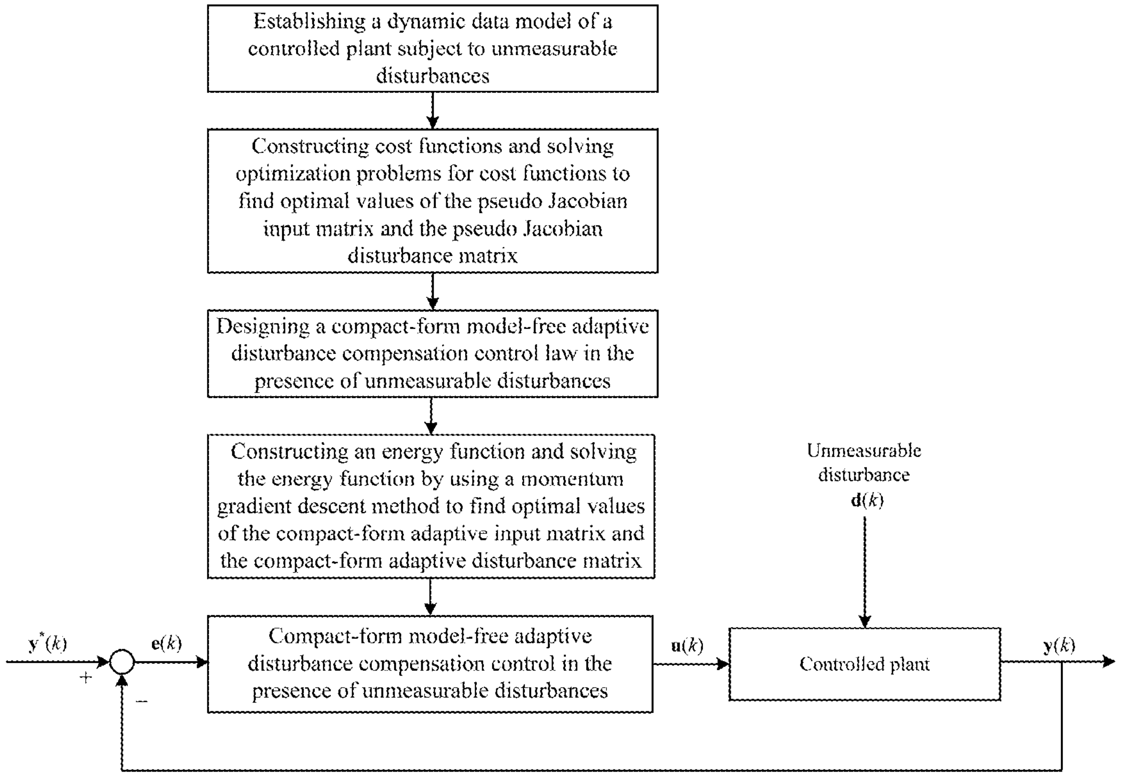
FIG. 1 shows a schematic diagram according to the embodiments of the present invention.

FIG. 1 shows a schematic diagram according to the embodiments of the present invention. A method of compact-form model-free adaptive disturbance compensation control in the presence of unmeasurable disturbances, includes establishing a dynamic data model of a controlled plant subject to unmeasurable disturbances, wherein the dynamic data model is described by a pseudo Jacobian input matrix and a pseudo Jacobian disturbance matrix; constructing cost functions and solving their optimization problems to find optimal values of the pseudo Jacobian input matrix and the pseudo Jacobian disturbance matrix; designing a compact-form model-free adaptive disturbance compensation control law in the presence of unmeasurable disturbances; constructing an energy function and solving it by using a momentum gradient descent method to find optimal values of the compact-form adaptive input matrix and the compact-form adaptive disturbance matrix; controlling the controlled plant by using the control law.

In the following, the implementation steps of the compact-form model-free adaptive disturbance compensation control in the presence of unmeasurable disturbances are further explained:

the method of compact-form model-free adaptive disturbance compensation control in the presence of unmeasurable disturbances, executed on a hardware platform for controlling a controlled plant subject to unmeasurable disturbances, said controlled plant being a multi-input multi-output (MIMO) system with a predetermined number of control inputs and a predetermined number of system outputs, said method comprising:

step 1: at time k, establishing a dynamic data model of said controlled plant subject to unmeasurable disturbances, wherein said dynamic data model is described by a pseudo Jacobian input matrix $\overline{\theta}(k)$ and a pseudo Jacobian disturbance matrix $\overline{\chi}(k)$;

step 2: constructing cost functions and solving optimization problems for said cost functions to find an optimal value of said pseudo Jacobian input matrix $\overline{\theta}(k)$ in said step 1 and an optimal value of said pseudo Jacobian disturbance matrix $\overline{\chi}(k)$ in said step 1;

step 3: employing said dynamic data model described by said optimal value of said pseudo Jacobian input matrix $\overline{\theta}(k)$ and said optimal value of said pseudo Jacobian disturbance matrix $\overline{\chi}(k)$ in said step 2, designing a compact-form model-free adaptive disturbance compensation control law in the presence of unmeasurable disturbances, wherein said control law comprising a compact-form adaptive input matrix $\overline{\pi}_c(k)$ and a compact-form adaptive disturbance matrix $\overline{\omega}_c(k)$;

step 4: constructing an energy function and solving said energy function by using a momentum gradient descent method to find an optimal value of said compact-form adaptive input matrix $\overline{\pi}_c(k)$ in said step 3 and an optimal value of said compact-form adaptive disturbance matrix $\overline{\omega}_c$ (k) in said step 3;

step 5: controlling said controlled plant by using said compact-form model-free adaptive disturbance compensation control law in the presence of unmeasurable disturbances with said optimal value of compact-form adaptive input matrix $\overline{\pi}_c(k)$ and said optimal value of compact-form adaptive disturbance matrix $\overline{\omega}_c(k)$ in said step 4, weakening the effect of unmeasurable disturbances on actual system outputs of said controlled plant, achieving effective tracking of desired system outputs of said controlled plant.

Said step 1, at time k, establishing a dynamic data model of said controlled plant subject to unmeasurable disturbances as $$\Delta y(k+1)=\overline{\theta}(k)\Delta u(k)+\overline{\chi}(k)\cdot 1_{q\times 1}$$

where k is a sampling time, k is a positive integer; y(k+1) is an actual system output vector of said controlled plant at time k+1, $y(k+1)=[y_1(k+1), \ldots, y_n(k+1)]^T$, $\Delta y(k+1)=y(k+1)-y(k)$; n is a total number of system outputs in said controlled plant, n is a positive integer greater than 1; u(k) is a control input vector of said controlled plant at time k, $u(k)=[u_1(k), \ldots, u_m(k)]^T$, $\Delta u(k)=u(k)-u(k-1)$; m is a total number of control inputs in said controlled plant, m is a positive integer greater than 1; $1_{q\times 1}=[1; 1; \ldots; 1]_{q\times 1}$, q is a total number of unmeasurable disturbances in said controlled plant, q is a positive integer; $\overline{\theta}(k)$ is said pseudo Jacobian input matrix at time k and $\overline{\chi}(k)$ is said pseudo Jacobian disturbance matrix at time k.

Said step 2, constructing cost functions and solving optimization problems for said cost functions to find an optimal value of said pseudo Jacobian input matrix $\overline{\theta}(k)$ in said step 1 and an optimal value of said pseudo Jacobian disturbance matrix $\overline{\chi}(k)$ in said step 1, comprising:

step 2.1: constructing a cost function for said pseudo Jacobian input matrix $\overline{\theta}(k)$ as $$J(\overline{\theta}(k))=\left\|\Delta y(k)-\overline{\theta}(k)\Delta u(k-1)-\overline{\chi}(k-1)\cdot 1_{q\times 1}\right\|^2+\mu_1\left\|\Delta\overline{\theta}(k)\right\|^2$$

where $\mu_1$ is the first weighting factor; $\Delta\overline{\theta}(k)=\overline{\theta}(k)-\overline{\theta}(k-1)$; $\|\square\|$ is a Euclidean norm;

step 2.2: constructing a cost function for said pseudo Jacobian disturbance matrix $\overline{\chi}(k)$ as $$J(\overline{\chi}(k))=\left\|\Delta y(k)-\overline{\theta}(k-1)\Delta u(k-1)-\overline{\chi}(k)\cdot 1_{q\times 1}\right\|^2+\mu_2\|\Delta\overline{\chi}(k)\|^2$$

where $\mu_2$ is the second weighting factor; $\Delta\overline{\chi}(k)=\overline{\chi}(k)-\overline{\chi}(k-1)$;

step 2.3: solving an optimization problem for said $J(\overline{\theta}(k))$ in said step 2.1, finding an optimal value of said pseudo Jacobian input matrix $\overline{\theta}(k)$ as $$\overline{\theta}(k)=\overline{\theta}(k-1)+\frac{\alpha_1\left(\Delta y(k)-\overline{\theta}(k-1)\Delta u(k-1)-\overline{\chi}(k-1)\cdot 1_{1\times q}\right)\Delta u(k-1)^T}{\mu_1+\|\Delta u(k-1)\|^2}$$

where $\alpha_1$ is the first step size factor;

step 2.4: solving an optimization problem for said $J(\overline{\chi}(k))$ in said step 2.2, finding an optimal value of said pseudo Jacobian disturbance matrix $\overline{\chi}(k)$ as $$\overline{\chi}(k)=\overline{\chi}(k-1)+\frac{\alpha_2\left(\Delta y(k)-\overline{\theta}(k-1)\Delta u(k-1)-\overline{\chi}(k-1)\cdot 1_{1\times q}\right)\cdot 1_{1\times q}}{\mu_2+q}$$

where $\alpha_2$ is the second step size factor.

Said step 3, employing said dynamic data model described by said optimal value of said pseudo Jacobian input matrix $\overline{\theta}(k)$ and said optimal value of said pseudo Jacobian disturbance matrix $\overline{\chi}(k)$ in said step 2, designing a compact-form model-free adaptive disturbance compensation control law in the presence of unmeasurable disturbances as $$u(k)=u(k-1)-\overline{\pi}_c(k)e(k)+\overline{\omega}_c(k)\cdot 1_{q\times 1}$$

where e(k) is a system error vector of said controlled plant at time k, $e(k)=y^*(k)-y(k)$, $y^*(k)$ is a desired system output vector of said controlled plant at time k, $e(k)=[e_1(k), \ldots, e_n(k)]^T$, $\Delta e(k)=e(k)-e(k-1)$; $\overline{\pi}_c(k)$ is said compact-form adaptive input matrix at time k and $\overline{\omega}_c(k)$ is said compact-form adaptive disturbance matrix at time k.

Said step 4, constructing an energy function and solving said energy function by using a momentum gradient descent method to find an optimal value of said compact-form adaptive input matrix $\overline{\pi}_c(k)$ in said step 3 and an optimal value of said compact-form adaptive disturbance matrix $\overline{\omega}_c(k)$ in said step 3, comprising:

step 4.1: constructing an energy function as $$W = \frac{1}{2}\|y^*(k+1) - y(k+1)\|^2 + \frac{1}{2}\lambda\|\Delta u(k)\|^2$$

where y*(k+1) is a desired system output vector of said controlled plant at time k+1, $$y^*(k+1) = [y_1^*(k+1), \ldots, y_n^*(k+1)]^T;$$

$\lambda$ is a penalty factor;

step 4.2: solving said energy function in said step 4.1 by using a momentum gradient descent method, finding an optimal value of said compact-form adaptive input matrix $\overline{\pi}_c(k)$ as $$\overline{\pi}_c(k) = \overline{\pi}_c(k-1) - \sigma_1 \frac{\partial W}{\partial \overline{\pi}_c(k-1)} + \eta_1 \Delta\overline{\pi}_c(k-1)$$

where $\sigma_1$ is the first learning rate, is the first momentum factor;

$$\Delta\overline{\pi}_c(k-1) = \overline{\pi}_c(k-1) - \overline{\pi}_c(k-2); \quad \frac{\partial W}{\partial \overline{\pi}_c(k-1)}$$

is a partial derivative of said energy function W to $\overline{\pi}_c(k-1)$;

step 4.3: solving said energy function in said step 4.1 by using a momentum gradient descent method, finding an optimal value of said compact-form adaptive disturbance matrix $\overline{\omega}_c(k)$ as $$\overline{\omega}_c(k) = \overline{\omega}_c(k-1) - \sigma_2 \frac{\partial W}{\partial \overline{\omega}_c(k-1)} + \eta_2 \Delta\overline{\omega}_c(k-1)$$

where $\sigma_2$ is the second learning rate, $\eta_2$ is the second momentum factor;

$$\Delta\overline{\omega}_c(k-1) = \overline{\omega}_c(k-1) - \overline{\omega}_c(k-2); \quad \frac{\partial W}{\partial \overline{\omega}_c(k-1)}$$

is a partial derivative of said energy function W to $\overline{\omega}_c(k-1)$.

Said partial derivative of said energy function W to $\overline{\pi}_c(k-1)$ in said step 4.2 is calculated as $$\frac{\partial W}{\partial \overline{\pi}_c(k-1)} = \frac{\partial y(k)}{\partial u(k-1)} e(k)e(k-1)^T - \lambda\Delta u(k-1)e(k-1)^T;$$

said partial derivative of said energy function W to $\overline{\omega}_c(k-1)$ in said step 4.3 is calculated as $$\frac{\partial W}{\partial \overline{\pi}_c(k-1)} = -\frac{\partial y(k)}{\partial u(k-1)} e(k)\cdot 1_{1\times q} + \lambda\Delta u(k-1)\cdot 1_{1\times q}.$$

Said $$\frac{\partial y(k)}{\partial u(k-1)}$$

is calculated as $$\frac{\partial y(k)}{\partial u(k-1)} = \overline{\theta}(k)^T.$$

Said step 5, controlling said controlled plant by using said compact-form model-free adaptive disturbance compensation control law in the presence of unmeasurable disturbances with said optimal value of compact-form adaptive input matrix $\overline{\pi}_c(k)$ and said optimal value of compact-form adaptive disturbance matrix $\overline{\omega}_c(k)$ in said step 4, comprising:

step 5.1: obtaining a desired system output vector y*(k) and an actual system output vector y(k), calculating a system error vector e(k);

step 5.2: based on said step 5.1, calculating a control input vector u(k) according to said compact-form model-free adaptive disturbance compensation control law in the presence of unmeasurable disturbances with said optimal value of said compact-form adaptive input matrix $\overline{\pi}_c(k)$ and said optimal value of said compact-form adaptive disturbance matrix $\overline{\omega}_c(k)$ in said step 4;

step 5.3: generating an actual system output vector of said controlled plant based on application of said control input vector u(k).

Figure 2:
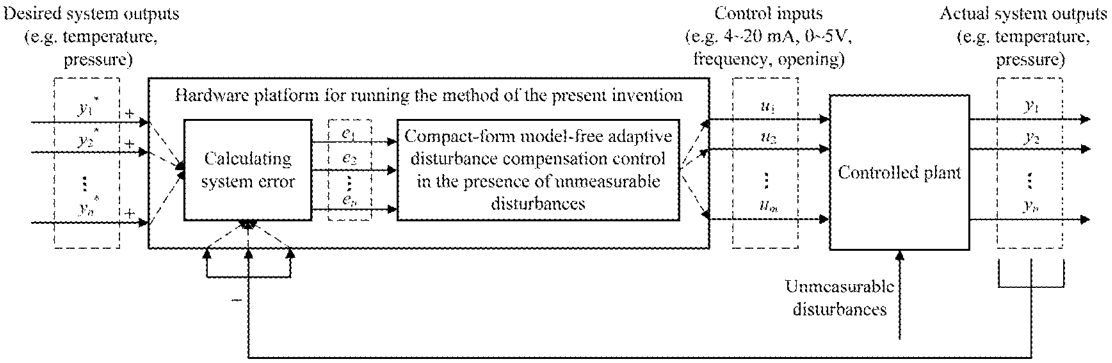
FIG. 2 shows a block diagram of an engineering application according to the embodiments of the present invention.
Figure 3:
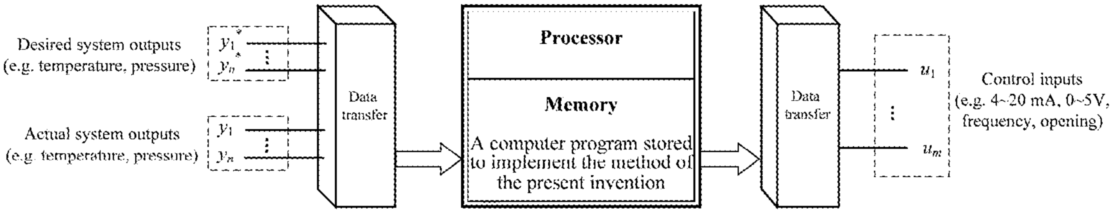
FIG. 3 shows a schematic diagram of a hardware platform for running the embodiments of the present invention.

FIG. 2 shows a block diagram of an engineering application according to the embodiments of the present invention. For the hardware platform in FIG. 2, a schematic diagram of the hardware platform for running the embodiments of the present invention is shown in FIG. 3; specifically, a non-transitory computer-readable storage medium having a computer program stored thereon, wherein when said computer program is executed by a processor, causing said processor to carry out the method of compact-form model-free adaptive disturbance compensation control in the presence of unmeasurable disturbances; an electronic device comprising a memory, a processor, and a computer program stored on said memory and runnable on said processor, wherein when said processor executes said computer program, causing said processor to carry out the method of compact-form model-free adaptive disturbance compensation control in the presence of unmeasurable disturbances.

Two exemplary embodiments of the present invention are given for further explanation.

The First Exemplary Embodiment a two-input two-output controlled plant:

$$x_{11}(k+1) = \frac{x_{11}^2(k)}{1 + x_{11}^2(k)} + 0.3x_{12}(k)$$

$$x_{12}(k+1) = \frac{x_{11}^2(k)}{1 + x_{12}^2(k) + x_{21}^2(k) + x_{22}^2(k)} + a(k)u_1(k) + d_1(k)$$

$$x_{21}(k+1) = \frac{x_{21}^2(k)}{1 + x_{21}^2(k)} + 0.2x_{22}(k)$$

$$x_{22}(k+1) = \frac{x_{21}^2(k)}{1 + x_{11}^2(k) + x_{12}^2(k) + x_{22}^2(k)} + b(k)u_2(k) + d_2(k)$$

-continued $$y_1(k+1)=x_{11}(k+1)$$

$$y_2(k+1)=x_{21}(k+1)$$

where a(k)=1+0.1 sin (2πk/1500), b(k)=1+0.1 cos(2πk/1500) are two time-varying parameters; $d_1(k)$, $d_2(k)$ are unmeasurable disturbances given as $$\begin{bmatrix} d_1(k) \\ d_2(k) \end{bmatrix} = \begin{cases} \begin{bmatrix} 0.3\cos(k/20) \\ e^{-0.01k}\sin(k/10) \end{bmatrix}, & k \le 700 \\ \begin{bmatrix} 0.2\sin(k/20)+0.2\sin(k/10) \\ 0.5+0.15\sin(k/20) \end{bmatrix}, & k > 700 \end{cases}$$

It should be noted that the unmeasurable disturbances are only used to generate the actual system outputs and are not involved in the design of the control method. The two-input two-output controlled plant is subject to unmeasurable disturbances.

The desired system outputs are as follows:

$$y_1^*(k) = \begin{cases} 2, & k \le 550 \\ -0.15, & k > 550 \end{cases}$$

$$y_2^*(k) = \begin{cases} 0, & k \le 700 \\ 1, & k > 700 \end{cases}$$

In this embodiment, m=n=q=2.

As is known to all, the existing PID is a well-established and widely used control method in the field of control theory and engineering, which is used for comparison in the embodiments of the present invention. To quantitatively compare the control performance of the control method of the present invention with the existing PID control method, the integral time-weighted absolute error (ITAE) is used as the control performance index for evaluation:

$$ITAE(e_j)=\sum_{k=1}^{N} k|e_j(k)|$$

where $e_j(k)=y^*_j(k)-y_j(k)$, $y^*_j(k)$ is the j-th desired system output at time k, $y_j(k)$ is the j-th actual system output at time k, j=1, . . . , n. The smaller the value of ITAE($e_j$), the smaller the error between the j-th actual system output and the j-th desired system output, the higher control accuracy and response speed, and the better the control performance.

The hardware platform for running the embodiment of the present invention is the industrial control computer.

The embodiment of the present invention adopts the compact-form model-free adaptive disturbance compensation control in the presence of unmeasurable disturbances; set the parameters of the control method of the present invention as $$\overline{\chi}(1)=[0.5, 0; 0, 0.1], \overline{\pi}_c(1)=[-0.55, 0; 0, -0.45],$$

$$\overline{\varpi}_c(1)=[0.2, 0; 0.15, -0.3], \alpha_1=0.3, \alpha_2=0.2, \mu_1=3, \mu_2=1,$$

$$\sigma_1=0.1, \sigma_2=0.9, \eta_1=0.6, \eta_2=0.1, \lambda=0.4.$$

When controlling the two-input two-output controlled plant in the first exemplary embodiment by using the compact-form model-free adaptive disturbance compensation control in the presence of unmeasurable disturbances, the following steps are included at each time k: a) obtaining the desired system output vector y*(k) and the actual system output vector y(k), calculating the system error vector e (k); b) based on step a), calculating the control input vector u(k) according to the compact-form model-free adaptive disturbance compensation control in the presence of unmeasurable disturbances with the optimal value of the compact-form adaptive input matrix $\overline{\pi}_c(k)$ and the optimal value of the compact-form adaptive disturbance matrix $\overline{\varpi}_c(k)$; c) controlling the controlled plant by applying the control input vector u(k), generating the actual system output vector of the controlled plant at time k+1 based on the application of the control input vector; d) repeating steps a) to c) until the end of the control time.

Figure 4:
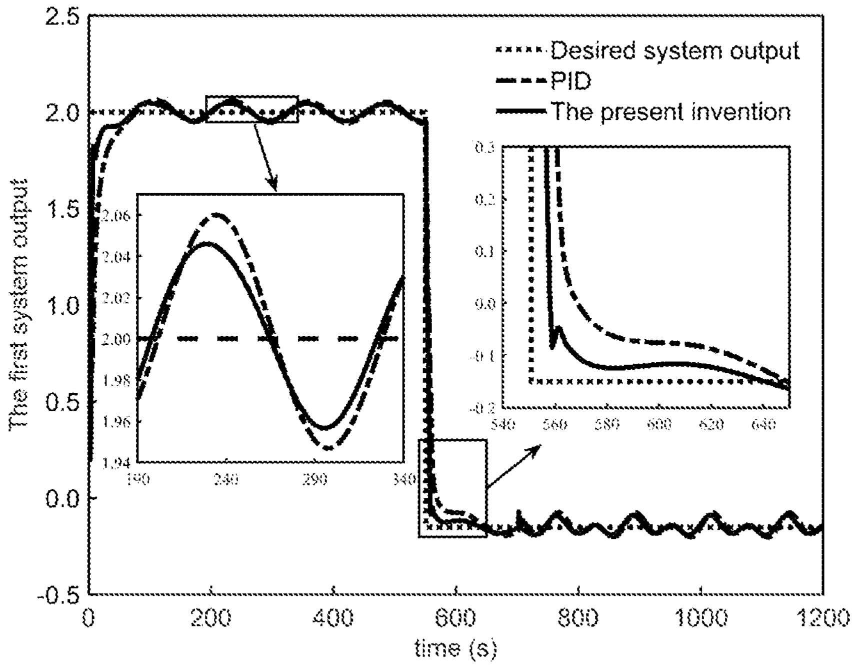
FIG. 4 shows the tracking performance of the first system output when controlling the two-input two-output controlled plant in the first exemplary embodiment by using the compact-form model-free adaptive disturbance compensation control in the presence of unmeasurable disturbances and the PID control method.
Figure 5:
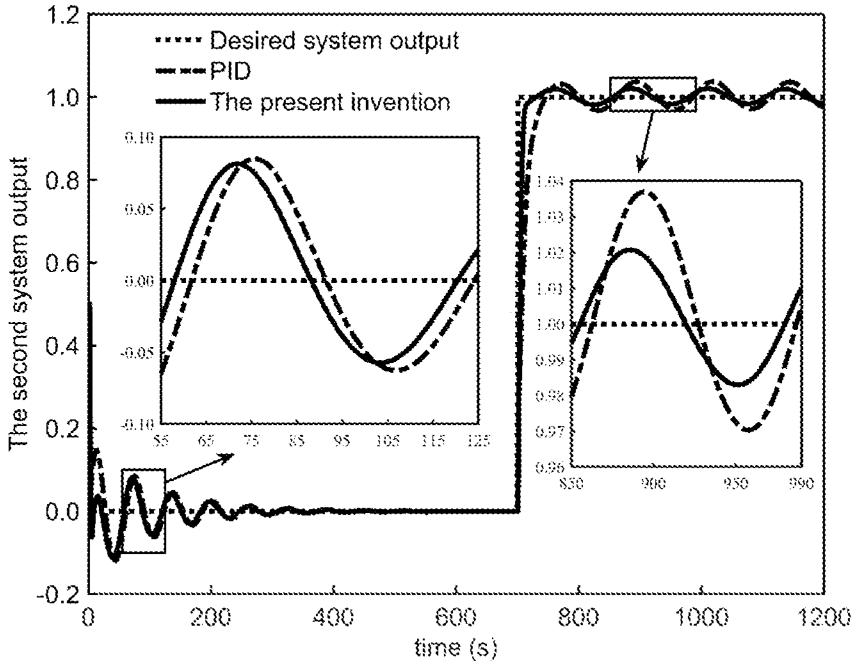
FIG. 5 shows the tracking performance of the second system output when controlling the two-input two-output controlled plant in the first exemplary embodiment by using the compact-form model-free adaptive disturbance compensation control in the presence of unmeasurable disturbances and the PID control method.
Figure 6:
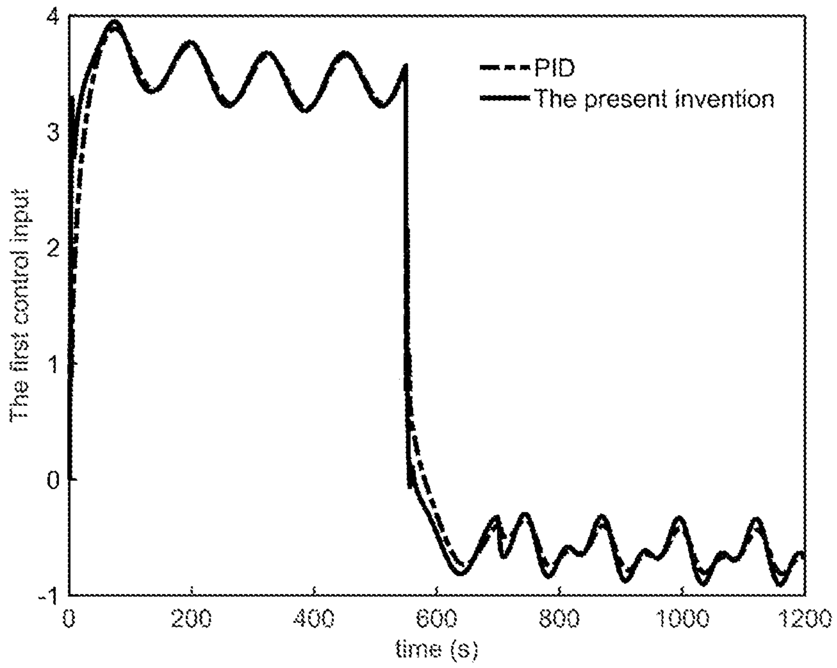
FIG. 6 shows the first control input when controlling the two-input two-output controlled plant in the first exemplary embodiment by using the compact-form model-free adaptive disturbance compensation control in the presence of unmeasurable disturbances and the PID control method.
Figure 7:
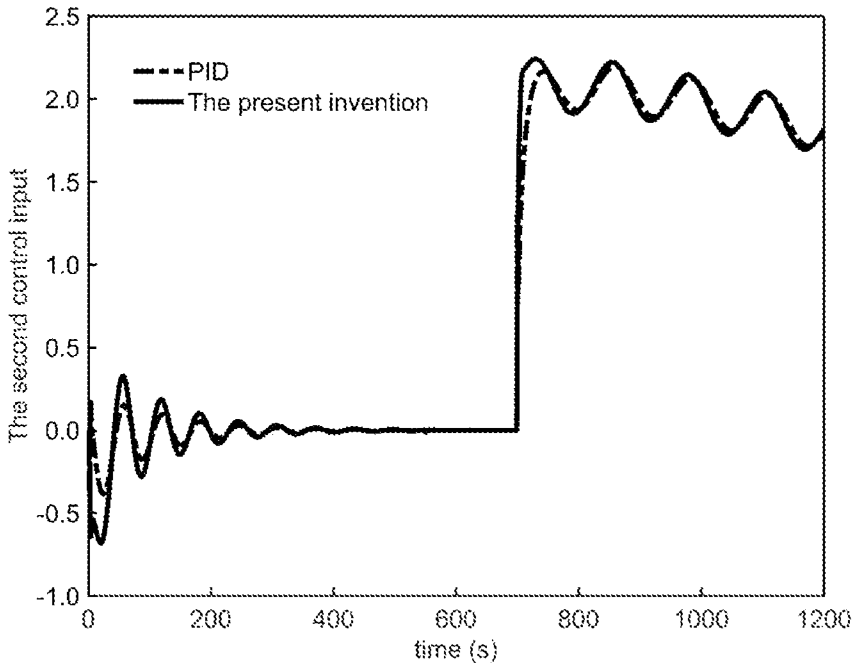
FIG. 7 shows the second control input when controlling the two-input two-output controlled plant in the first exemplary embodiment by using the compact-form model-free adaptive disturbance compensation control in the presence of unmeasurable disturbances and the PID control method.

The control performance of the control method of the present invention and the PID control method are given in FIGS. 4-7. FIG. 4 shows the tracking performance of the first system output when controlling the two-input two-output controlled plant in the first exemplary embodiment by using the compact-form model-free adaptive disturbance compensation control in the presence of unmeasurable disturbances and the PID control method; FIG. 5 shows the tracking performance of the second system output when controlling the two-input two-output controlled plant in the first exemplary embodiment by using the compact-form model-free adaptive disturbance compensation control in the presence of unmeasurable disturbances and the PID control method; FIG. 6 shows the first control input when controlling the two-input two-output controlled plant in the first exemplary embodiment by using the compact-form model-free adaptive disturbance compensation control in the presence of unmeasurable disturbances and the PID control method; and FIG. 7 shows the second control input when controlling the two-input two-output controlled plant in the first exemplary embodiment by using the compact-form model-free adaptive disturbance compensation control in the presence of unmeasurable disturbances and the PID control method; comparing the control performance indexes, the ITAE($e_1$) of the first system output controlled by the control method of the present invention is 23511, the ITAE($e_2$) of the second system output controlled by the control method of the present invention is 9732, the ITAE($e_1$) of the first system output controlled by the PID control method is 32190, the ITAE($e_2$) of the second system output controlled by the PID control method is 17413, the comparison results of the control performance indexes are listed in Table 1; comparing the system output curves, the control method of the present invention can effectively suppress the effect of unmeasurable disturbances on actual system outputs of the two-input two-output controlled plant, and the control performance using the control method of the present invention is better than that using the PID control method. From the above comparison results, it can be seen that the compact-form model-free adaptive disturbance compensation control in the presence of unmeasurable disturbances provides a significant improvement in disturbance compensation control performance and achieves effective tracking of the desired system outputs.

TABLE 1

| Comparison Results of The Control Performance Index | | |
|---|---|---|
| | ITAE($e_1$) | ITAE($e_2$) |
| PID | 32190 | 17413 |
| The present invention | 23511 | 9732 |

The Second Exemplary Embodiment

Figure 8:
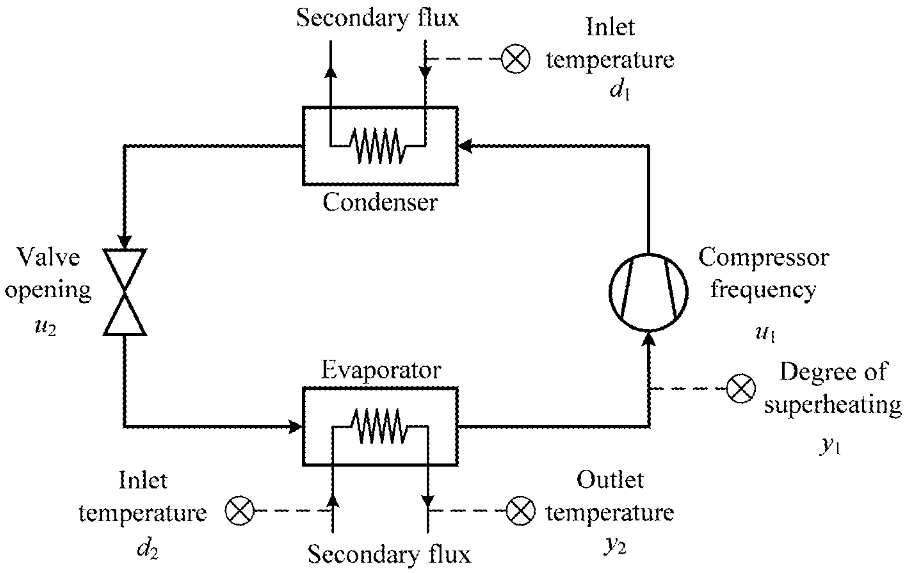
FIG. 8 shows a refrigeration cycle of a vapor compression refrigeration system.

Vapor Compression Refrigeration Systems (VCRS) are the most common refrigeration cycle equipment used in homes (e.g., home refrigerators, air conditioners), commercial (e.g., building and automotive air conditioning, refrigerated warehouses) and industrial (e.g., petrochemical plants, natural gas processing plants), and the refrigeration cycle of the vapor compression refrigeration system is shown in FIG. 8. Two disturbances of the vapor compression refrigeration system are the inlet temperature of the condenser secondary flux and the inlet temperature of the evaporator secondary flux. Nowadays, high energy-consuming refrigeration equipment is used in large quantities, and the realization of disturbance compensation control of VCRS is of great significance to the promotion of energy conservation and consumption reduction in the world.

Figure 9:
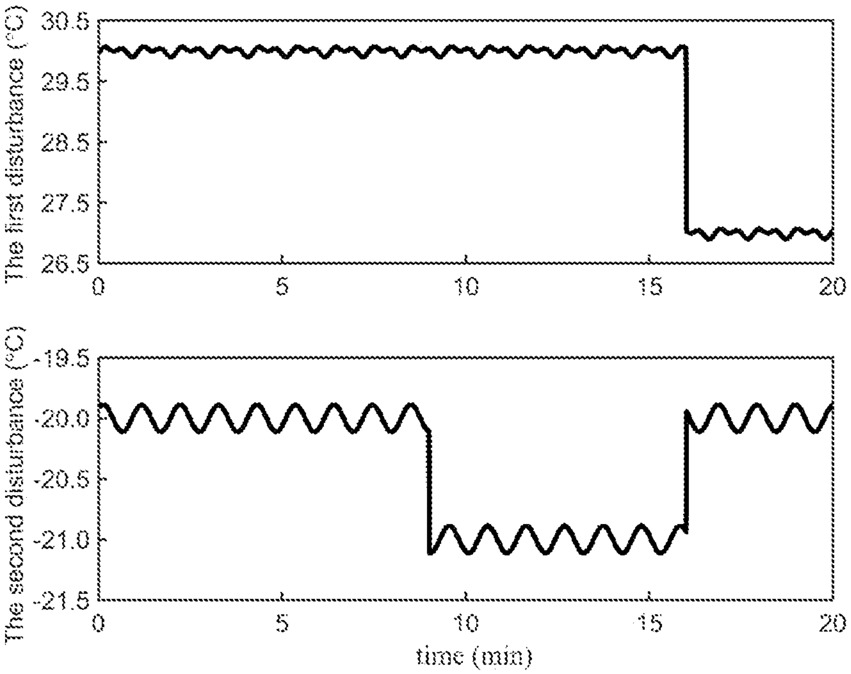
FIG. 9 shows the two unmeasurable disturbances in the vapor compression refrigeration system.

The vapor compression refrigeration system is a two-input two-output controlled plant. Two control inputs $u_1$ and $u_2$ of the vapor compression refrigeration system are the compressor frequency (Hz) and valving opening (%), respectively. Two system outputs $y_1$ and $y_2$ of the vapor compression refrigeration system are the degree of superheating (° C.) and the outlet temperature of the evaporator secondary flux (° C.), respectively. Two disturbances $d_1$ and $d_2$ of the vapor compression refrigeration system are the inlet temperature of the condenser secondary flux (° C.) and the inlet temperature of the evaporator secondary flux (° C.), respectively, where $d_1$, $d_2$ are not measured online via temperature sensors and are therefore unmeasurable disturbances. FIG. 9 shows the two unmeasurable disturbances in the vapor compression refrigeration system. The vapor compression refrigeration system is a two-input two-output controlled plant subject to unmeasurable disturbances. In this embodiment, m=n=q=2. The hardware platform for running the embodiment of the present invention is the industrial control computer.

The initial conditions of the vapor compression refrigeration system are given as: $u_1(0)=36.45$ Hz, $u_2(0)=48.79\%$, $y_1(0)=14.65°$ C., $y_2(0)=-22.15°$ C. To meet the cooling demand of the evaporator secondary flux, the desired system output $y^*_1$ is adjusted from 14.65° C. to 7.2° C. at the 2nd min, then adjusted from 7.2° C. to 22.2° C. at the 9th min, and finally adjusted from 22.2° C. to 11.65° C. at the 16th min, the desired system output $y^*_2$ is adjusted from −22.15° C. to −22.65° C. at the 2nd min.

The embodiment of the present invention adopts the compact-form model-free adaptive disturbance compensation control in the presence of unmeasurable disturbances; set the parameters of the control method of the present invention as $$\overline{\chi}(1) = [0.1, 0; 0, 0.1], \overline{\pi}_c(1) = [-1.5, 0; 0, -1],$$

$$\overline{\varpi}_c(1) = [-0.05, 0.05; 0.05, -0.05], \alpha_1 = 0.5, \alpha_2 = 0.5,$$

-continued $$\mu_1 = 1, \mu_2 = 1, \sigma_1 = 0.1, \sigma_2 = 0.9, \eta_1 = 0.2, \eta_2 = 0.1, \lambda = 0.1.$$

When controlling the vapor compression refrigeration system in the second exemplary embodiment by using the compact-form model-free adaptive disturbance compensation control in the presence of unmeasurable disturbances, the following steps are included at each time k: a) obtaining the desired system output vector y*(k) and the actual system output vector y(k), calculating the system error vector e(k); b) based on step a), calculating the control input vector u(k) according to the compact-form model-free adaptive disturbance compensation control in the presence of unmeasurable disturbances with the optimal value of the compact-form adaptive input matrix $\overline{\pi}_c(k)$ and the optimal value of the compact-form adaptive disturbance matrix $\overline{\omega}_c(k)$; c) controlling the vapor compression refrigeration system by applying the control input vector u(k), generating the actual system output vector of the vapor compression refrigeration system at time k+1 based on the application of the control input vector; d) repeating steps a) to c) until the end of the control time.

Figure 10:
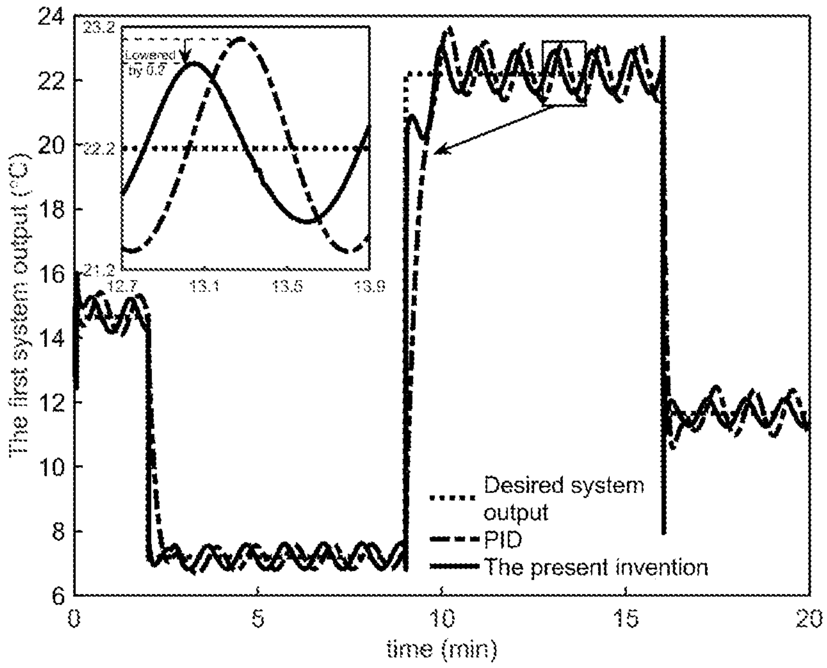
FIG. 10 shows the tracking performance of the first system output when controlling the vapor compression refrigeration system in the second exemplary embodiment by using the compact-form model-free adaptive disturbance compensation control in the presence of unmeasurable disturbances and the PID control method.
Figure 11:
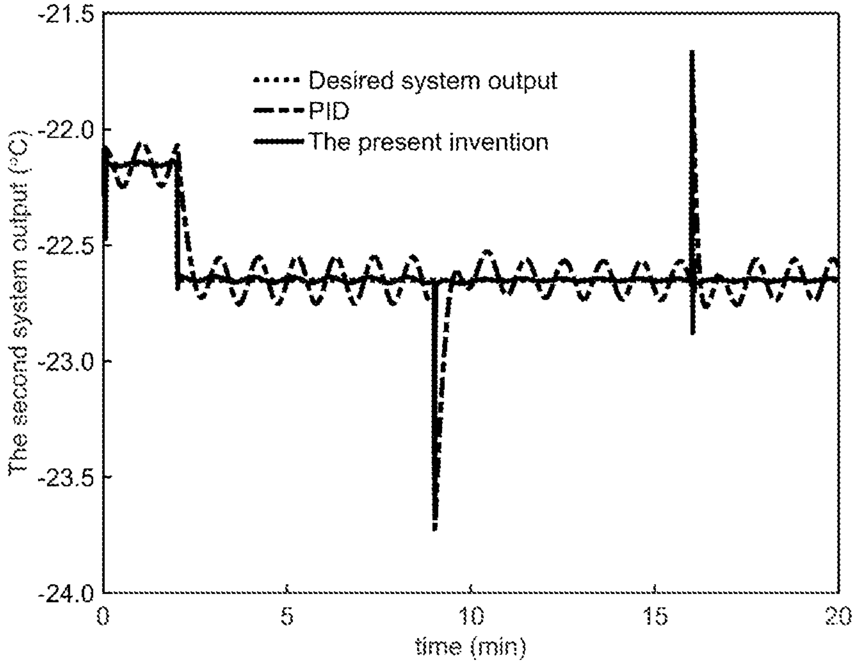
FIG. 11 shows the tracking performance of the second system output when controlling the vapor compression refrigeration system in the second exemplary embodiment by using the compact-form model-free adaptive disturbance compensation control in the presence of unmeasurable disturbances and the PID control method.
Figure 12:
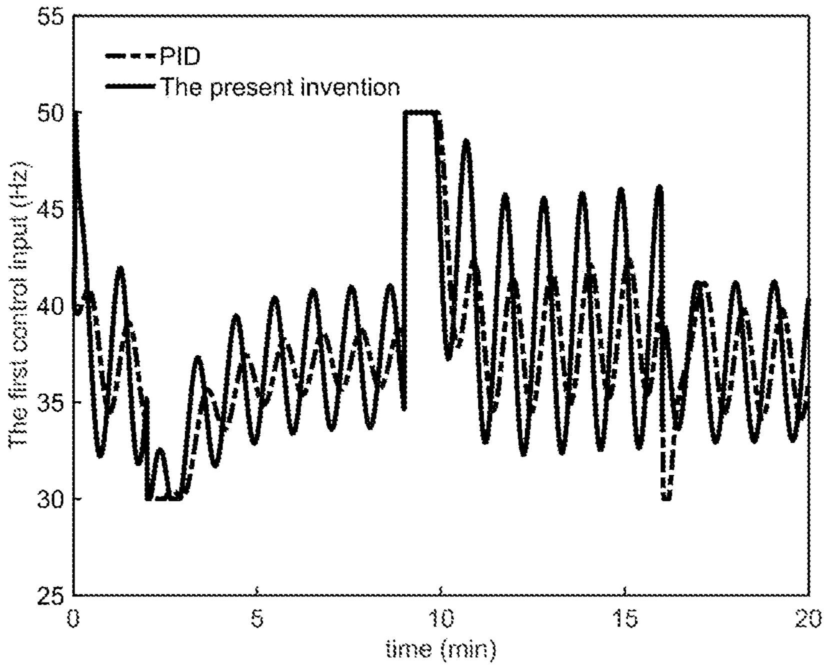
FIG. 12 shows the first control input when controlling the vapor compression refrigeration system in the second exemplary embodiment by using the compact-form model-free adaptive disturbance compensation control in the presence of unmeasurable disturbances and the PID control method.
Figure 13:
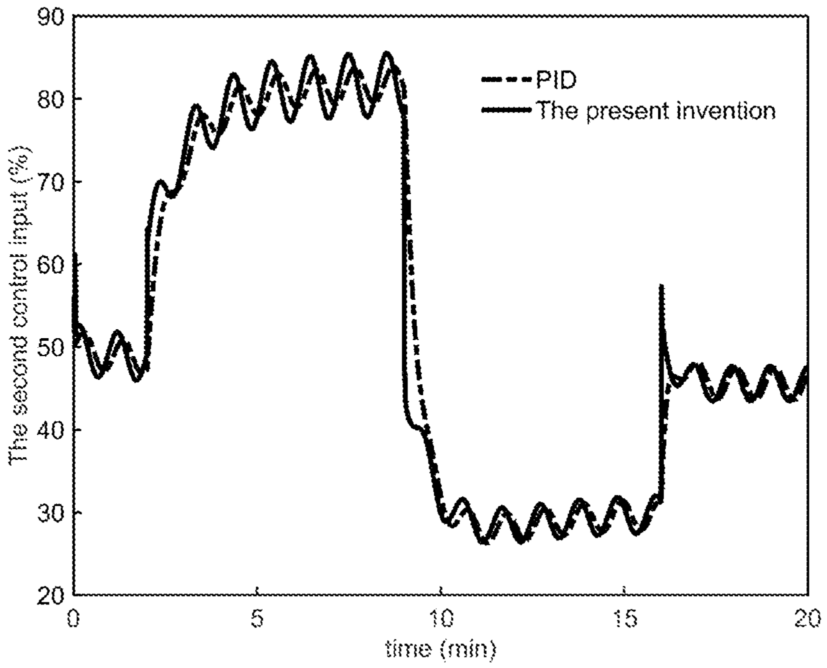
FIG. 13 shows the second control input when controlling the vapor compression refrigeration system in the second exemplary embodiment by using the compact-form model-free adaptive disturbance compensation control in the presence of unmeasurable disturbances and the PID control method.

The control performance of the control method of the present invention and the existing PID control method are given in FIGS. 10-13. FIG. 10 shows the tracking performance of the first system output when controlling the vapor compression refrigeration system in the second exemplary embodiment by using the compact-form model-free adaptive disturbance compensation control in the presence of unmeasurable disturbances and the PID control method; FIG. 11 shows the tracking performance of the second system output when controlling the vapor compression refrigeration system in the second exemplary embodiment by using the compact-form model-free adaptive disturbance compensation control in the presence of unmeasurable disturbances and the PID control method; FIG. 12 shows the first control input when controlling the vapor compression refrigeration system in the second exemplary embodiment by using the compact-form model-free adaptive disturbance compensation control in the presence of unmeasurable disturbances and the PID control method; and FIG. 13 shows the second control input when controlling the vapor compression refrigeration system in the second exemplary embodiment by using the compact-form model-free adaptive disturbance compensation control in the presence of unmeasurable disturbances and the PID control method; comparing the control performance indexes, the ITAE($e_1$) of the first system output controlled by the control method of the present invention is 291180, the ITAE($e_2$) of the second system output controlled by the control method of the present invention is 5732, the ITAE($e_1$) of the first system output controlled by the PID control method is 506970, the ITAE($e_2$) of the second system output controlled by the PID control method is 52244, the comparison results of the control performance indexes are listed in Table 2; comparing the system output curves, the control method of the present invention can effectively suppress the effect of unmeasurable disturbances on actual system outputs of the vapor compression refrigeration system, and the control performance using the control method of the present invention is better than that using the PID control method. From the above comparison results, it can be seen that the compact-form model-free adaptive disturbance compensation control in the presence of unmeasurable disturbances provides a significant improvement in disturbance compensation control performance and achieves effective tracking of the desired system outputs.

TABLE 2

Comparison Results of The Control Performance Indexes of VCRS

| | ITAE($e_1$) | ITAE($e_2$) |
|---|---|---|
| PID | 506970 | 52244 |
| The present invention | 291180 | 5732 |

Furthermore, the following two points should be noted in particular:

(1) Disturbances widely exist in actual control systems, such as controlled plants in oil refining, petrochemical, chemical, pharmaceutical, food, paper, water treatment, thermal power, metallurgy, cement, rubber, machinery, electrical, transportation, and robotics industries, including reactors, distillation towers, machines, equipment, devices, production lines, workshops, factories, unmanned vehicles, unmanned ships, unmanned aircraft, and autonomous mobile robots. By way of example, the vapor compression refrigeration system is affected by two persistent complex disturbances, i.e., the inlet temperature of the condenser secondary flux and the inlet temperature of the evaporator secondary flux. From the second exemplary embodiment, the control method of the present invention provides a significant improvement in disturbance compensation control performance and achieves effective tracking of the desired system outputs. To give another example, the unmanned ship in operation is extremely vulnerable to the impact of the wind field on the water, changes in wind speed and wind direction will not only affect the speed and heading of the unmanned ship, but may also lead to capsizing of the unmanned ship in serious cases; when the wind field on the water surface shows turbulent characteristics due to the influence of complex environment, the wind speed and wind direction show a random and irregular form of motion and become unmeasurable disturbances; the control method of the present invention can be used to compensate for the unmeasurable disturbances and realize the smooth operation of the unmanned ship, which is of great significance to improve the safety and reliability of the unmanned ship.

(2) In the first and second exemplary embodiments, the hardware platform for running the embodiments of the present invention is the industrial control computer; in practical applications, according to the specific circumstance, a single chip microcomputer controller, a microprocessor controller, a field programmable gate array controller, a digital signal processing controller, an embedded system controller, a programmable logic controller, a distributed control system, a fieldbus control system, an industrial control system based on internet of things, or an industrial internet control system, can also be used as the hardware platform for running the control method of the present invention.

From the above detailed description of the invention, it is clear to those skilled in the art that the implementation of the present invention can be achieved with the help of software and the necessary hardware platform. Embodiments of the present invention can be implemented by using the existing processor, or by a dedicated processor being used for this or other purposes in an appropriate system, or by a hardwired system. Embodiments of the present invention also include a non-transitory computer-readable storage medium comprising a machine-readable medium for carrying or having machine-executable instructions or data structures stored thereon; the machine-readable medium can be any available medium accessible by a general purpose or the dedicated computer or other machines with a processor. By way of example, the machine-readable medium includes RAM, ROM, EPROM, EEPROM, CD-ROM or other optical disk memory, disk memory or other magnetic storage devices, or any other medium that can carry or store the required computer program code in the form of machine-executable instructions or data structures, and that can be accessed by a general purpose or the dedicated computer or other machines with a processor. When information is transmitted or made available to a machine over a network or other communication connection (hardwired, wireless, or a combination of hardwired and wireless), the connection is also considered a machine-readable medium.

It should be appreciated that the foregoing is only preferred embodiments of the invention and is not for use in limiting the invention. Any modification, equivalent substitution, and improvement without departing from the spirit and principle of this invention should be covered in the protection scope of the invention.

The invention claimed is:

1. A method of compact-form model-free adaptive disturbance compensation control in the presence of unmeasurable disturbances, executed on a hardware platform for controlling a controlled plant subject to unmeasurable disturbances, said controlled plant being a multi-input multi-output (MIMO) system with a predetermined number of control inputs and a predetermined number of system outputs, said method comprising:

step 1: at time k, establishing a dynamic data model of said controlled plant subject to unmeasurable disturbances, wherein said dynamic data model is described by a pseudo Jacobian input matrix $\overline{\theta}(k)$ and a pseudo Jacobian disturbance matrix $\overline{\chi}(k)$;

step 2: constructing cost functions and solving optimization problems for said cost functions to find an optimal value of said pseudo Jacobian input matrix $\overline{\theta}(k)$ in said step 1 and an optimal value of said pseudo Jacobian disturbance matrix $\overline{\chi}(k)$ in said step 1;

step 3: employing said dynamic data model described by said optimal value of said pseudo Jacobian input matrix $\overline{\theta}(k)$ and said optimal value of said pseudo Jacobian disturbance matrix $\overline{\chi}(k)$ in said step 2, designing a compact-form model-free adaptive disturbance compensation control law as:

$$u(k)=u(k-1)-\overline{\pi}_c(k)e(k)+\overline{\omega}_c(k)\cdot 1_{q\times 1}$$

where e(k) is a system error vector of said controlled plant at time k, e(k)=y*(k)−y(k), $e(k)=[e_1(k), \ldots, e_n(k)]^T$, Δe(k)=e(k)−e(k−1); $\overline{\pi}_c(k)$(k) is a compact-form adaptive input matrix at time k and @ (k) is a compact-form adaptive disturbance matrix at time k;

step 4: constructing an energy function and solving said energy function by using a momentum gradient descent method to find an optimal value of said compact-form adaptive input matrix $\overline{\omega}_c(k)$ in said step 3 and an optimal value of said compact-form adaptive disturbance matrix $\overline{\omega}_c(k)$ in said step 3;

step 5: controlling said controlled plant by using said compact-form model-free adaptive disturbance compensation control law in the presence of unmeasurable disturbances with said optimal value of compact-form adaptive input matrix $\overline{\pi}_c(k)$ and said optimal value of compact-form adaptive disturbance matrix $\overline{\omega}_c(k)$ in said step 4, weakening the effect of unmeasurable disturbances on actual system outputs of said controlled plant, achieving effective tracking of desired system outputs of said controlled plant.

2. The method as claimed in claim 1 wherein said step 1, at time k, establishing a dynamic data model of said controlled plant subject to unmeasurable disturbances as $$\Delta y(k+1)=\overline{\theta}(k)\Delta u(k)+\overline{\chi}(k)\cdot 1_{q\times 1}$$

where k is a sampling time, k is a positive integer; y(k+1) is an actual system output vector of said controlled plant at time k+1, $y(k+1)=[y_1(k+1), \ldots, y_n(k+1)]^T$, $\Delta y(k+1)=y(k+1)-y(k)$; n is a total number of system outputs in said controlled plant, n is a positive integer greater than 1; u(k) is a control input vector of said controlled plant at time k, $u(k)=[u_1(k), \ldots, u_m(k)]^T$, $\Delta u(k)=u(k)-u(k-1)$; m is a total number of control inputs in said controlled plant, m is a positive integer greater than 1; $1_{q\times 1}=[1; 1; \ldots; 1]_{q\times 1}$, q is a total number of unmeasurable disturbances in said controlled plant, q is a positive integer; $\overline{\theta}(k)$ is said pseudo Jacobian input matrix at time k and $\overline{\chi}(k)$ is said pseudo Jacobian disturbance matrix at time k.

3. The method as claimed in claim 1 wherein said step 2, constructing cost functions and solving optimization problems for said cost functions to find an optimal value of said pseudo Jacobian input matrix $\overline{\theta}(k)$ in said step 1 and an optimal value of said pseudo Jacobian disturbance matrix $\overline{\chi}(k)$ in said step 1, comprising:

step 2.1: constructing a cost function for said pseudo Jacobian input matrix $\overline{\theta}(k)$ as $$J(\overline{\theta}(k))=\left\|\Delta y(k)-\overline{\theta}(k)\Delta u(k-1)-\overline{\chi}(k-1)\cdot 1_{q\times 1}\right\|^2+\mu_1\left\|\Delta\overline{\theta}(k)\right\|^2$$

where $\mu_1$ is the first weighting factor;

step 2.2: constructing a cost function for said pseudo Jacobian disturbance matrix $\overline{\chi}(k)$ as $$J(\overline{\chi}(k))=\left\|\Delta y(k)-\overline{\theta}(k-1)\Delta u(k-1)-\overline{\chi}(k)\cdot 1_{q\times 1}\right\|^2+\mu_2\|\Delta\overline{\chi}(k)\|^2$$

where $\mu_2$ is the second weighting factor;

step 2.3: solving an optimization problem for said $J(\overline{\theta}(k))$ in said step 2.1, finding an optimal value of said pseudo Jacobian input matrix $\overline{\theta}(k)$ as $$\overline{\theta}(k)=\overline{\theta}(k-1)+\frac{\alpha_1\left(\Delta y(k)-\overline{\theta}(k-1)\Delta u(k-1)-\overline{\chi}(k-1)\cdot 1_{q\times 1}\right)\Delta u(k-1)^T}{\mu_1+\|\Delta u(k-1)\|^2}$$

where $\alpha_1$ is the first step size factor;

step 2.4: solving an optimization problem for said $J(\overline{\chi}(k))$ in said step 2.2, finding an optimal value of said pseudo Jacobian disturbance matrix $\overline{\chi}(k)$ as $$\overline{\chi}(k)=\overline{\chi}(k-1)+\frac{\alpha_2\left(\Delta y(k)-\overline{\theta}(k-1)\Delta u(k-1)-\overline{\chi}(k-1)\cdot 1_{q\times 1}\right)\cdot 1_{1\times q}}{\mu_2+q}$$

where $\alpha_2$ is the second step size factor.

4. The method as claimed in claim 1 wherein said step 4, constructing an energy function and solving said energy function by using a momentum gradient descent method to find an optimal value of said compact-form adaptive input matrix $\overline{\pi}_c(k)$ in said step 3 and an optimal value of said compact-form adaptive disturbance matrix $\overline{\omega}_c(k)$ in said step 3, comprising:

step 4.1: constructing an energy function as $$W=\frac{1}{2}\|y^*(k+1)-y(k+1)\|^2+\frac{1}{2}\lambda\|\Delta u(k)\|^2$$

where y*(k+1) is a desired system output vector of said controlled plant at time k+1, $y^*(k+1)=[y^*_1(k+1), \ldots, y^*_n(k+1)]^T$; $\lambda$ is a penalty factor;

step 4.2: solving said energy function in said step 4.1 by using a momentum gradient descent method, finding an optimal value of said compact-form adaptive input matrix $\overline{\pi}_c(k)$ as $$\overline{\pi}_c(k)=\overline{\pi}_c(k-1)-\sigma_1\frac{\partial W}{\partial\overline{\pi}_c(k-1)}+\eta_1\Delta\overline{\pi}_c(k-1)$$

where $\sigma_1$ is the first learning rate, $\eta_1$ is the first momentum factor;

$$\Delta\overline{\pi}_c(k-1)=\overline{\pi}_c(k-1)-\overline{\pi}_c(k-2);\ \frac{\partial W}{\partial\overline{\pi}_c(k-1)}$$

is a partial derivative of said energy function W to $\overline{\pi}_c(k)$;

step 4.3: solving said energy function in said step 4.1 by using a momentum gradient descent method, finding an optimal value of said compact-form adaptive disturbance matrix $\overline{\omega}_c(k)$ as $$\overline{\omega}_c(k)=\overline{\omega}_c(k-1)-\sigma_2\frac{\partial W}{\partial\overline{\omega}_c(k-1)}+\eta_2\Delta\overline{\omega}_c(k-1)$$

where $\sigma_2$ is the second learning rate, $\eta_2$ is the second momentum factor;

$$\Delta\overline{\omega}_c(k-1)=\overline{\omega}_c(k-1)-\overline{\omega}_c(k-2);\ \frac{\partial W}{\partial\overline{\omega}_c(k-1)}$$

is a partial derivative of said energy function W to $\overline{\omega}_c(k-1)$.

5. The method as claimed in claim 1 wherein said partial derivative of said energy function W to $\overline{\pi}_c(k-1)$ in said step 4.2 is calculated as $$\frac{\partial W}{\partial\overline{\pi}_c(k-1)}=\frac{\partial y(k)}{\partial u(k-1)}e(k)e(k-1)^T-\lambda\Delta u(k-1)e(k-1)^T;$$

said partial derivative of said energy function W to $\overline{\omega}_c(k-1)$ in said step 4.3 is calculated as $$\frac{\partial W}{\partial \overline{\omega}_c(k-1)} = -\frac{\partial y(k)}{\partial u(k-1)} e(k) \cdot 1_{1\times q} + \lambda \Delta u(k-1) \cdot 1_{1\times q}.$$

6. The method as claimed in claim 4 wherein said $$\frac{\partial y(k)}{\partial u(k-1)}$$

is calculated as $$\frac{\partial y(k)}{\partial u(k-1)} = \overline{\theta}(k)^T.$$

7. The method as claimed in claim 1 wherein said step 5, controlling said controlled plant by using said compact-form model-free adaptive disturbance compensation control law in the presence of unmeasurable disturbances with said optimal value of compact-form adaptive input matrix $\overline{\pi}_c(k)$ and said optimal value of compact-form adaptive disturbance matrix $\overline{\omega}_c(k)$ in said step 4, comprising:

step 5.1: obtaining a desired system output vector y*(k) and an actual system output vector y(k), calculating a system error vector e(k);

step 5.2: based on said step 5.1, calculating a control input vector u(k) according to said compact-form model-free adaptive disturbance compensation control law in the presence of unmeasurable disturbances with said optimal value of said compact-form adaptive input matrix $\overline{\pi}_c(k)$ and said optimal value of said compact-form adaptive disturbance matrix $\overline{\omega}_c(k)$ in said step 4;

step 5.3: generating an actual system output vector of said controlled plant based on application of said control input vector u(k).

8. A non-transitory computer-readable storage medium having a computer program stored thereon, wherein when said computer program is executed by a processor, causing said processor to carry out said method of compact-form model-free adaptive disturbance compensation control in the presence of unmeasurable disturbances in claim 1.

9. An electronic device comprising a memory, a processor and a computer program stored on said memory and runnable on said processor, wherein when said processor executes said computer program, causing said processor to carry out said method of compact-form model-free adaptive disturbance compensation control in the presence of unmeasurable disturbances in claim 1.

* * * * *